United States Patent [19]
Ao et al.

[11] Patent Number: 5,155,740
[45] Date of Patent: Oct. 13, 1992

[54] FLICKER COMPENSATING APPARATUS FOR DC ARC FURNACE

[75] Inventors: Norio Ao; Kazuhiko Mori, both of Tokyo, Japan

[73] Assignee: NKK Corporation, Tokyo, Japan

[21] Appl. No.: 789,527

[22] Filed: Nov. 7, 1991

Related U.S. Application Data

[63] Continuation of Ser. No. 602,189, Oct. 22, 1990, abandoned.

[51] Int. Cl.$^5$ ............................................. H05B 7/144
[52] U.S. Cl. .................................... 373/108; 373/102; 373/104; 373/105; 323/210; 323/219
[58] Field of Search ............... 373/108, 102, 104, 105, 373/106, 47, 49, 50, 12, 39, 40, 70; 323/211, 210, 219

[56] References Cited

U.S. PATENT DOCUMENTS

| | | | |
|---|---|---|---|
| 3,968,422 | 7/1976 | Waldmann | 373/104 |
| 3,987,359 | 10/1976 | Thompson | 323/101 |
| 3,989,999 | 11/1976 | Thompson et al. | 373/104 |
| 3,999,117 | 12/1976 | Gyugyi et al. | 323/211 |
| 4,001,671 | 1/1977 | Gyugyi et al. | 323/211 |
| 4,068,159 | 1/1978 | Gyugyi | 323/211 |
| 4,320,245 | 3/1982 | Gaydon et al. | 373/104 |
| 4,403,327 | 9/1983 | Granstrom | 373/80 |
| 4,607,373 | 8/1986 | Bergman | 373/108 |
| 4,691,325 | 9/1987 | Boisdon | 373/108 |
| 4,698,581 | 10/1987 | Shimamura et al. | 373/104 |
| 4,857,821 | 8/1989 | Takeda | 373/104 |

FOREIGN PATENT DOCUMENTS 0214661 3/1987 European Pat. Off.
2-278317 11/1990 Japan.
2075284 4/1981 United Kingdom.

OTHER PUBLICATIONS

Brown Boveri Review, vol. 73, No. 8, Aug. 1986, pp. 471-480 article entitled "Effects of Electric Arc Furnaces on Power Systems and Methods of Compensation" by D. Grundberg et al.

Elektrowarme International, vol. 48, No. 3, Aug., 1990, pp. B125-B130; article entitled Limits to Flicker Reduction of Static Var Compensators with Arc Furnaces.

Revue Generale De L'Electricite, No. 2, Feb., 1988, pp. 31-35 article entitled Flicker Reduction Performance of Static Var Compensators with Arc Furnaces.

"Recent improvement in the steel-making arc furnaces and their power supply", Technical Report (Part II). No. 72 (Dec. 16, 1978), The Institute of Electrical Engineers of Japan.

Primary Examiner—Bruce A. Reynolds
Assistant Examiner—Tu Hoang
Attorney, Agent, or Firm—Frishauf, Holtz, Goodman & Woodward

[57] ABSTRACT

A flicker compensating apparatus for compensating for flickering due to a variation in the reactive power generated from a DC arc furnace connected by an AC/DC converter to an AC power system, comprises: a current detector for detecting a DC current flowing in the DC arc furnace; a controller for determining the phase control angle of a thyristor included in the AC/DC converter in accordance with the difference between the detected DC current and a predetermined reference current; a calculator for calculating reactive power to be generated by the DC arc furnace, from the detected DC current, the determined phase control angle, and a no-load DC voltage; a compensator including a reactive load connected via thyristor to the power system; and a controller for controlling the phase control angle of the thyristor of the compensator in accordance with the calculated reactive power, for controlling a current flowing across the reactive load, and for permitting the compensator to generate such reactive power as to compensate for a variation in the calculated reactive power.

10 Claims, 3 Drawing Sheets

FLICKER COMPENSATING APPARATUS FOR DC ARC FURNACE

This application is a Continuation of application Ser. No. 07/602189, filed Oct. 22, 1990, now abandoned.

BACKGROUND OF THE INVENTION

1. Field of the Invention

The present invention relates to the improvement of a flicker compensating apparatus for a DC arc furnace, which reduces the amount of flickering caused by a variation in load of the DC arc furnace which melts a raw material to be molten (hereinafter called "melting stock"), such as iron scrap, direct reduced iron, and pig iron, using DC arc discharge.

2. Description of the Related Art

In general, when the desired current is applied to a graphite electrode inserted in an arc furnace, arc discharge occurs between this electrode and melting stocks placed in the furnace and melts the melting stocks. The arc discharge can easily create a high-temperature environment, has a high energy density, and has an advantage of easiness in controlling the arc current. In this respect, the arc discharge is widely utilized in melting of melting stocks.

Conventionally, a three-phase AC arc furnace has been used for steel making to melt melting stocks. However, increased consumption of steel demands a greater furnace of which productivity increases in the amount of melting stocks, and the capacity of the arc furnace has been increased as needed and many large three-phase AC arc furnaces of the capacity above 70 tons are operated. Accordingly, the unit power capacity tends to become larger, 500 KVA/ton or greater. As a result, the power trouble caused by the arc furnace, so-called flicker trouble on supply line, is becoming a major issue. More specifically, in an arc furnace which melts melting stocks, an arc generally occurs between the graphite electrode and melting stocks, but as the melting proceeds melting stocks fall and dislocate due to melt down around the electrode, the nearest melting stock position and length change, and so short arc or off arcing often occurs. This greatly varies the voltage applied to the arc furnace and arc current. In an AC arc furnace, a current flowing through the electrode becomes zero every half cycle, and so off arcing, and arc shorting frequently occurs. Then the arc is very unstable as viewed from the power system and becomes a significantly fluctuatable load. Such a load fluctuation changes the voltage of the power system and also varies the voltage in civil user's houses connected to the same power system, which may cause flickering of light.

Researches have been conducted from various angles to find out what causes the flickering in an arc furnace, and it was reported that the fluctuating level of reactive power due to a fluctuation of arc is an important factor to determine the degree of the flicker trouble ("Recent improvement in the stealmaking arc furnaces and their power supply", Technical Report (Part II). No. 72. (1978. Dec. 16), The Institute of Electrical Engineers of Japan).

With the above situations and the results of the researches considered, recent large AC arc furnace facilities are often provided with a flicker compensating apparatus as shown in FIG. 1. An AC arc furnace 3 is connected via a step-down transformer 2 for the furnace to an AC power system 1. The AC power from the power system 1 is stepped-down to a predetermined voltage by the transformer 2, then supplied to a movable electrode 4 inserted in the AC arc furnace 3 to generate an arc between the distal end of the electrode 4 and melting stocks placed in the furnace 3. The movable electrode 4 can be moved in the vertical direction so that the distance between its distal end and the melting stocks can be changed. The generation of the arc produces reactive power with a delayed phase. The continuous variation of the reactive power causes a flicker. In order to prevent an occurrence of the flicker and to compensate for the variation of the reactive power caused by the variation of the arc, a flicker compensating apparatus is provided in the power system 1 of the AC arc furnace 3.

A main portion of the flicker compensating apparatus comprises a capacitor 11 operating as high harmonic filter and improving the power factor to perform such pre-compensation as to cause the power system 1 to have a predetermined advanced phase in order to cancel the phase delayed by the reactive power, and a reactive load 17 for making a delay angle of the reactive power detected by a reactive power detector 12 constant. Each phase is provided with flicker compensator 18 formed of the capacitor 11 and a series circuit of the step-down transformer 15, thyristor 16, and reactive load 17.

A control section for the reactive load 17 comprises the reactive power detector 12 for detecting reactive power generated in the power system 1 based on the current and voltage thereof, a phase angle controller 13 for outputting a phase control angle instruction signal corresponding to the reactive power detected, a pulse generator 14 for outputting a phase control angle signal (pulse signal) according to this instruction signal, and the series circuit of the step-down transformer 15 and the reactive load 17 connected thereto via the thyristor 16 whose phase control angle is controlled by the pulse signal from the pulse generator 14, the series circuit connected to the power system 1. Controlling the phase angle of the thyristor 16 can control the current flowing through the reactive load 17. Consequently, such reactive power as to permit the power system 1 to always have a constant level of reactive power can be applied via the thyristor 16 to the power system 1 from the reactive load 17 by controlling the phase angle of the thyristor 16 based on a change in reactive power of the power system 1 detected by the detector 12.

The reactive power produced by the AC arc furnace 3 is irregular, making it difficult for the phase angle controller 13 to accurately predict it and properly control the phase control angle of the thyristor 16. Accordingly, a control delay of about 5 msec (quarter cycle) occurs even though the reactive power from the power system 1 is detected and controlled, resulting in insufficient compensation and undesirable contribution to causing the flickering in some cases. There is therefore a limit to the compensation effect of the flicker compensating apparatus for use in the AC arc furnace 3. In addition, the flicker compensating apparatus does not contribute so much to production of steel and, what is more, requires a great amount of facility expense.

Recent advancing power electronics technology, however, enhances the reliability of an AC/DC converter which converts AC power to DC power, and at the same time has led to development of large DC arc furnace employing the AC/DC converter. The DC arc furnace, as compared with the AC arc furnace 3, has proved to significantly contribute to reduction of the amount of consumption of the electric power, electrode and refractories, and reduction of the flickering. This effect of reducing the flicker occurrence is possible through the constant control of the arc current (DC current at the time of operation) by the AC/DC converter.

As should be apparent from the general P (effective power) vs. Q (reactive power) characteristic shown in FIG. 2, the level of the change of reactive power of a DC arc furnace, $\Delta Qdc$ (=difference between reactive power $Qs_{dc}$ at the time of short-circuiting and reactive power Qo at the normal operation time), is approximately half the level of the change of reactive power of an AC arc furnace, $\Delta Qac$. Referring to the same diagram, DC indicates the P-Q characteristic curve of the DC arc furnace, and AC the P-Q characteristic curve of the AC arc furnace.

The reactive power Q of the DC arc furnace can be expressed by the following simple equation:

$$Q \approx Eo \cdot Id \cdot \sin\alpha \qquad (1)$$

where Eo is a no-load DC voltage, Id is an arc current and $\alpha$ is a phase control angle of a thyristor included in an AC/DC converter. Of these parameters, the no-load DC voltage Eo is specifically determined by the secondary voltage of the furnace transformer, and the arc current Id is constant due to a constant current control executed in the DC arc furnace at the time of operation and its sudden change is suppressed by the smoothing effect of the DC reactor. Therefore, an instantaneous change in reactive power is determined by the arc current Id and phase control angle $\alpha$, the latter being a large factor.

The reactive power in the AC arc furnace 3 is determined by $3 \cdot Ia^2 \cdot Xf$ where Ia is an arc current and Xf is the circuit reactance of the furnace.

As should be apparent from the above, the DC arc furnace and AC arc furnace have different mechanisms of generating reactive power. The level of a change in reactive power in the DC arc furnace can be reduced to a half that in the AC arc furnace due to the arc current being constant in the former furnace. However, there still is a case where the level of the flicker occurrent exceeds the limit, so that the DC arc furnace also needs a flicker compensating apparatus.

Conventionally, however, the flicker compensating apparatus for the AC arc furnace as shown in FIG. 1 is used for the DC arc furnace, and no specially designed flicker compensating apparatus for the DC arc furnace has existed. Naturally, there is about 5 msec of delay occurring in detection and control of the reactive power in the conventional flicker compensating apparatus for the DC arc furnace as in that of the AC arc furnace, and it is particularly difficult to properly cope with the instantaneous change in reactive power, resulting in insufficient compensating performance.

SUMMARY OF THE INVENTION

It is therefore an object of the present invention to provide a flicker compensating apparatus for a DC arc furnace, which can properly control the reactive power of the power system without a delay with respect to a variation in reactive power generated in the DC arc furnace to thereby properly perform the flicker compensating function.

A flicker compensating apparatus for a DC arc furnace according to the present invention comprises a flicker compensator having a reactive load connected via a switching element to the power system to which a DC arc furnace is connected via an AC/DC converter, for applying reactive power to the power system, a circuit for calculating reactive power generated by a DC arc furnace using a DC current flowing in the DC arc furnace and a phase control angle for controlling the AC/DC converter, and a pulse generator for controlling the switching element in accordance with the reactive power calculated by the calculating circuit to thereby control the reactive power applied to the power system by the flicker compensator.

According to the flicker compensating apparatus of the present invention, at the time the phase control angle of a thyristor of the AC/DC converter connected between the DC arc furnace and the AC power system is controlled, reactive power that is generated in the power system by the DC arc furnace is predicted using this phase control angle and a DC current flowing in the DC arc furnace, and a thyristor of the flicker compensator is controlled on the basis of the predicted value of the reactive power to control the phase control angle of the thyristor of the AC/DC converter and compensate for reactive power generated in the power system by the DC arc furnace at the same time. This can permit the reactive power of the power system to be constant and reduce the flickering.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
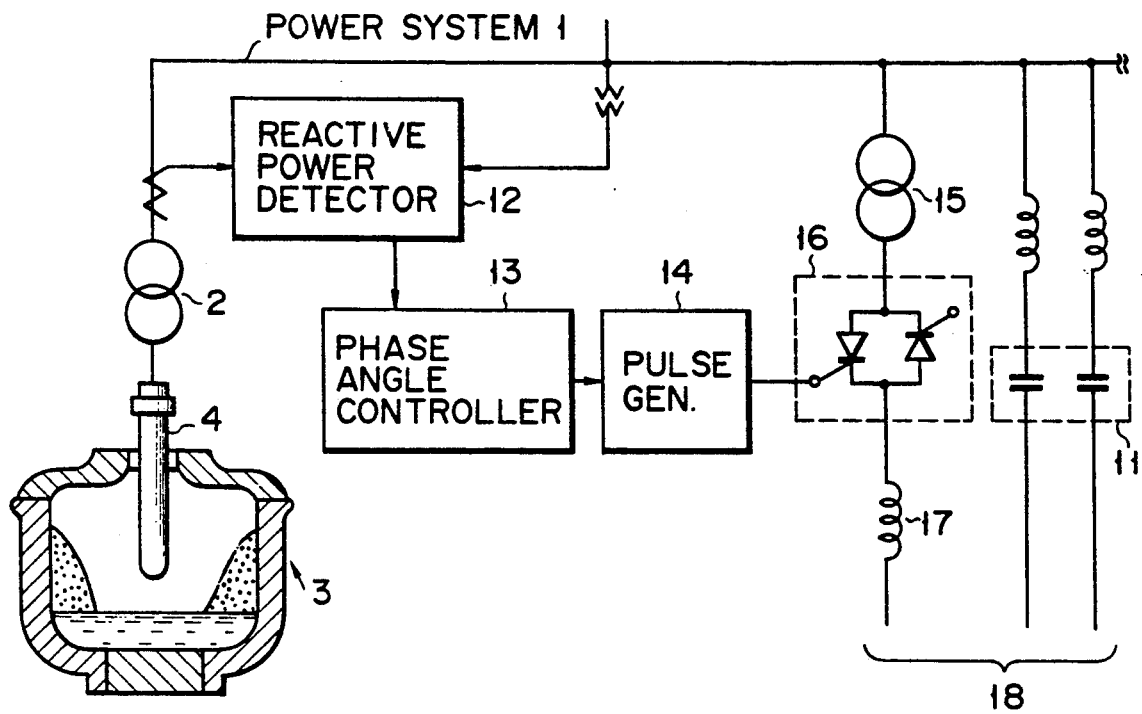
FIG. 1 is a block diagram exemplifying a conventional flicker compensating apparatus for an AC arc furnace.
Figure 2:
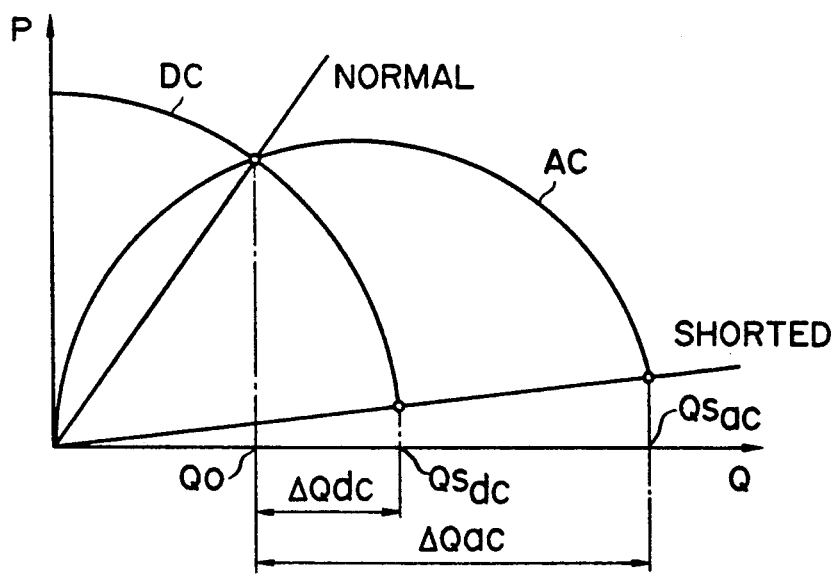
FIG. 2 is a characteristic chart illustrating the difference betwen the reactive of an AC arc furnace and that of a DC arc furnace.
Figure 3:
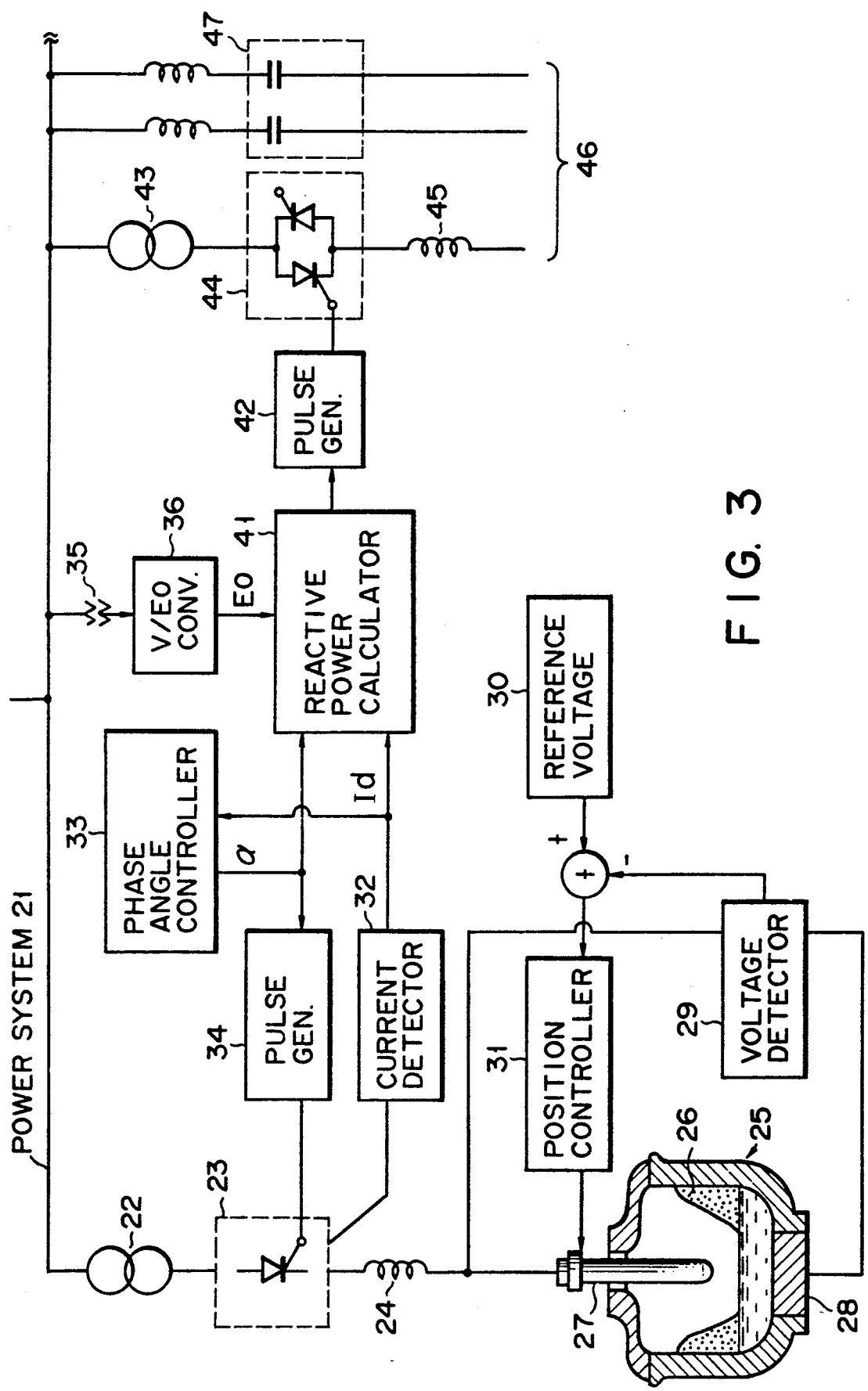
FIG. 3 is a block diagram showing the first embodiment of a flicker compensating apparatus for a DC arc furnace according to the present invention.

Preferred embodiments of the present invention will now be described with reference to the accompanying drawings. FIG. 3 shows a block diagram illustrating the structure of the first embodiment. As in a general case of using a DC arc furnace to melt melting stocks, an AC voltage from an AC power system 21 is stepped-down to a predetermined voltage by a furnace transformer 22, is converted into a DC voltage by an AC/DC converter 23 using a bridge-connected thyristors, is then smoothed by a DC reactor 24 before being applied to a DC arc furnace 25.

The control for vertically moving a movable electrode 27 of the DC arc furnace 25 and the control of the arc current (DC current at the time of operation) are performed using the same technique as employed in the prior art. The former control for vertical movement of the electrode 27 is realized in such a way that after melting stocks are placed in the arc furnace 25, the DC voltage applied between the movable electrode 27 and an electrode 28 at the bottom of the furnace 25 is detected by a voltage detector 29, the detected voltage is compared with a reference voltage set by a voltage setting unit 30, and a position controller 31 controls the vertical movement of the movable electrode 27 in response to the voltage difference between the detected voltage and the reference voltage. The latter arc current control is realized in such a manner that an arc current Id at the output side of the AC/DC converter 23 is detected by a current detector 32, and the detected current is supplied to a phase angle controller 33 for the AC/DC converter, which outputs an instruction signal representing a phase control angle $\alpha$ in accordance with the difference between the detected current Id and a set current corresponding to a predetermined arc current to thereby vary the phase control angle c of the thyristors included in the AC/DC converter 23 through a pulse generator 34.

The structure of the flicker compensating apparatus, which is the subject matter of the present invention, will be described below. The compensation principle of this apparatus is such that reactive power which occurs at the time of controlling the phase angle of the converter 23 is predicted based on the aforementioned equation (1), and reactive power according to this predicted value is applied to the power system 21 by a flicker compensator having a reactive load to make the reactive power of the power system 21 to be always constant. In other words, reactive power corresponding to the difference between the detected reactive power and the constant reactive power is generated from the flicker compensator. To work out the principle, the flicker compensator comprises a detector 35 for detecting an AC voltage V of the power system 21, a converter 36 for multiplying the AC voltage V by a given coefficient to acquire a no-load DC voltage Eo, a reactive power calculator 41 for predicting reactive power of the power system 21 generatable by a change in arc based on the equation (1) using the no-load DC voltage Eo, the detected arc current Id from the current detector 32, and the phase control angle c from the phase angle controller 33, a pulse generator 42 for outputting a pulse having a phase angle corresponding to the output of the calculator 41 in synchronism with an AC cycle, and a series circuit of a step-down transformer 43, a thyristor 44, and a reactive load 45, which is connected to the same power system 21 of the DC arc furnace 25 through the thyristor 44 and the transformer 43. The output pulse of the pulse generator 42 controls the phase control angle of the thyristor 44 and changes the current flowing across the reactive load 45. More specifically, the pulse generator 42 generates a pulse signal to control the thyristor 44 in such a way as to reduce the amount of reactive power of the reactive load 45 when the amount of predicted reactive power is large and to increase the reactive power of the reactive load 45 when the predicted amount is small. A variation in reactive power of the power system 21 generated by a change in arc can be compensated by the reactive power generated by the reactive load 45. The flicker compensator further comprises capacitors 47 operating as a high harmonic filter and improving the power factor, which is connected to the power system 21. A flicker compensator 46 including this series circuit and the capacitor 47 is provided for each phase.

Of the operation of the thus constituted first embodiment, the flicker compensating operation will be particularly described below. In general, a flicker occurs due to a variation in reactive power generated by a change in load of the DC arc furnace 25. The reactive power generated in the DC arc furnace 25 can be approximately expressed by the aforementioned equation (1). As the no-load DC voltage Eo is specifically determined by the secondary voltage of the furnace transformer 22, it should not necessarily be detected but may be given in advance as a constant value. Since a sudden change in arc current Id is suppressed to about 1 KA/msec by the DC reactor 24 and the phase control angle $\alpha$ is the phase control angle of the AC/DC converter 23 of the DC arc furnace 25, the amount of generatable reactive power can be predicted by Eo, Id and $\alpha$ in the case of the DC arc furnace 25. If such reactive power as to cancel out the predicted value of the reactive power is generated by the reactive load 45 of the flicker compensator 46 and is applied to the power system 21, the reactive power of the power system 21 can be rendered constant, thus reducing the amount of flickering occurred.

According to this embodiment, the phase angle controller 33 controls the phase control angle of the thyristor of the AC/DC converter 23 using the phase control angle $\alpha$ acquired on the basis of the detected arc current Id from the current detector 32 and the set current, thereby controlling the arc current Id to be constant. At this time, the reactive power calculator 41 predicts the amount of reactive power generatable by the DC arc furnace 25, wherein the phase angle controller 33 controls the phase control angle of the thyristor of the AC/DC converter 23, from the equation (1) using the instruction signal of the phase control angle $\alpha$, the no-load DC voltage Eo, and the arc current Id. By changing the phase angle of the pulse signal generated by the pulse generator 42 to control the phase control angle of the thyristor 44 based on the predicted reactive power, the current flowing across the reactive load 45 can be changed to permit the desired reactive power to be generated from the flicker compensator 46 and applied to the power system 21. In other words, at the time of the phase control angle of the thyristor of the AC/DC converter 23 is controlled, the changed amount of reactive power generated in the DC arc furnace 25 can be applied to the power system 21 by the flicker compensator 46, thereby ensuring a constant reactive power of the power system 21 and significantly reducing the flickering.

As described above, the first embodiment can realize a flicker compensating apparatus for a DC arc furnace, which can properly control the reactive power of the power system without a delay in response to a variation in reactive power generated in the DC arc furnace since compensating reactive power is applied to the power system by the flicker compensator at the time of controlling the phase control angle of the AC/DC converter 23, can greatly reduce the flicker occurrence compared with the prior art, and can present the proper flicker compensating performance.

Figure 4:
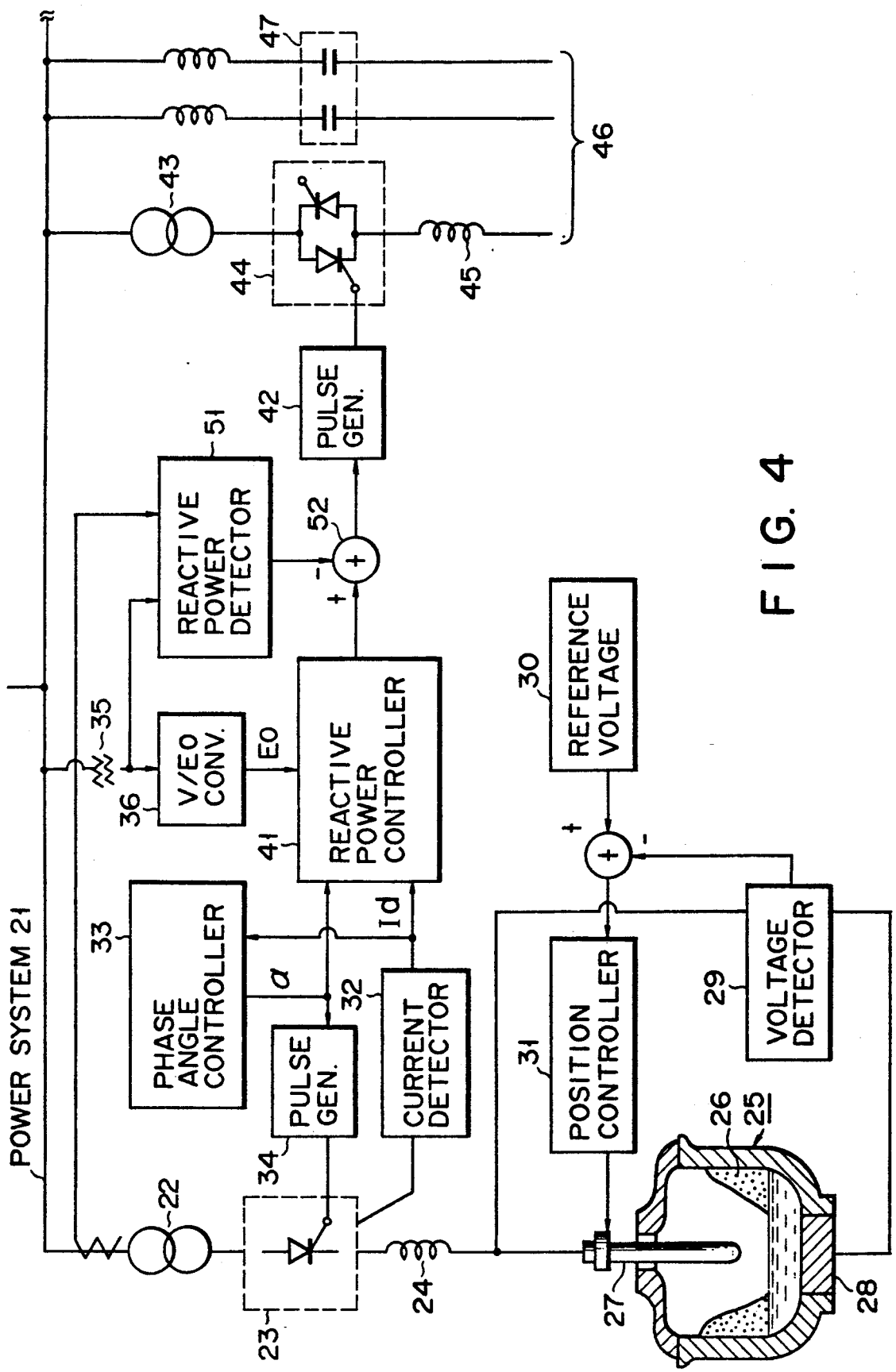
FIG. 4 is a block diagram of the second embodiment of the present invention.

The second embodiment will now be described referring to FIG. 4. The same reference numerals as used for the components of the first embodiment are used in FIG. 4 to denote the identical or corresponding elements in the second embodiment, thus omitting their description. The second embodiment differs from the first one in additional provision of a reactive power detector 51 and an adder/subtracter 52, which sends the difference between the predicted reactive power from the reactive power calculator 41 and the reactive power detected by the detector 51 to the pulse generator 42 for controlling the phase control angle.

According to the second embodiment, therefore, the reactive power for flicker compensation is generated in response to the pulse from the pulse generator 42 in accordance with the difference between the reactive power predicted by the reactive power calculator 41 using the equation (1) and the actual reactive power generated in the power system 21, not based only on the predicted reactive power. This feature can compensate for a variation in reactive power more accurately than the first embodiment.

As described above, the present invention can provide such a flicker compensating apparatus that, when the phase control angle of the AC/DC converter connected between the DC arc furnace and the AC power system is controlled, the reactive power generatable in the DC arc furnace is predicted using this phase control angle and the DC current flowing in the DC arc furnace, the phase control angle of the thyristor of the flicker compensator is controlled without delay on the basis of the predicted value. At the same time as the phase control angle of the AC/DC converter is controlled, therefore, reactive power for compensating the reactive power generated by the phase control angle can be applied to the power system by the flicker compensator, making the reactive power of the power system constant and reducing the flicker occurrence.

The present invention is not limited to the above particular embodiments, but may be modified in various manners. For instance, the details of a DC arc furnace are not limited to those illustrated. In addition, since the no-load DC voltage Eo and arc current Id (at least the no-load DC voltage) can be considered constant at the time of predicting the reactive power, it is possible to detect only the phase control angle and perform the calculation using it as a variable. Further, for finer control, the thyristor of the flicker compensator for each phase may be controlled on the basis of the phase control angle of the thyristor of each phase of the AC/DC converter. If the voltage drop due to an impedance of the transformer and power supply is corrected by using the equation (1), the accuracy can be more improved.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A flicker compensating apparatus for a DC arc furnace connected via an AC/DC converting means to an AC power system, comprising flicker compensating means for applying reactive power to the power system and having, for each phase of the AC power system, a reactance for controlling through a thyristor switching element a current supplied to a reactive load and a capacitor for serving as a high frequency filter and improving a power factor, a control circuit for the thyristor switching element comprising calculating means for calculating an effective value of a reactive power of the DC arc furnace, wherein said calculating means comprises:

current detecting means for detecting an instantaneous value of an effective DC current flowing through the AC/DC converting means;

phase angle control means for controlling a phase control angle of the AC/DC converting means;

converting means for obtaining a no-load DC voltage of the AC/DC converting means; and predicting means for calculating the effective value of reactive power of the DC arc furnace based on the detected instantaneous value of the effective DC current, the phase control angle of the AC/DC converting means, and the no-load DC voltage of the AC/DC converting means.

2. An apparatus according to claim 1, wherein said calculating means further comprises:

means for predicting the reactive power according to a product of a sin value of the phase control angle output from said phase angle control means, the instantaneous value of the DC current detected by said current detecting means, and the no-load DC voltage obtained by said converting means.

3. A flicker compensating apparatus for a DC arc furnace connected via an AC/DC converting means to an AC power system, comprising flicker compensating means for applying reactive power to the power system and having, for each phase of the AC power system, a reactance for controlling through a thyristor switching element a current supplied to a reactive load and a capacitor for serving as a high frequency filter and improving a power factor, a control circuit for the thyristor switching element comprising calculating means for calculating an effective value of a reactive power of the DC arc furnace, wherein said calculating means comprises:

a calculating circuit comprises:

current detecting means for detecting an instantaneous value of an effective DC current flowing through the AC/DC converting means;

phase angle control means for controlling a phase control angle of the AC/DC converting means;

converting means for obtaining a no-load DC voltage of the AC/DC converting means; and predicting means for calculating the effective value of reactive power of the DC arc furnace based on the detected instantaneous value of the effective DC current, the phase control angle of the AC/DC converting means, and the no-load DC voltage of the AC/DC converting means;

power detecting means for detecting the reactive power of the power system; and means for controlling the thyristor switching element based on a difference between the reactive power calculated by said calculating circuit and the reactive power detected by said power detecting means.

4. An apparatus according to claim 3, wherein said calculating circuit comprises:

means for calculating the reactive power according to a product of a sin value of the phase control angle output from said phase angle control means, the instantaneous value of the DC current detected by said current detecting means, and the no-load DC voltage obtained by said converting means.

5. A flicker compensating apparatus for a DC arc furnace connected via an AC/DC converting means to an AC power system, comprising:
    means for calculating reactive power generated by the DC arc furnace based on a phase control angle of said AC/DC converting means, an arc DC current, and a no-load DC voltage of the AC/DC converting means; and
    means for applying said reactive power calculated by said calculating means to said AC power system.

6. An apparatus according to claim 5, wherein said applying means includes a reactance connected to each phase of said power system.

7. An apparatus according to claim 6, wherein said applying means further includes:
    a thyristor connected between said reactance and each phase of said power system; and
    means for controlling a phase control angle of said thyristor in accordance with said reactive power calculated by said calculating means.

8. An apparatus according to claim 6, further comprising a capacitor serving as a high harmonic filter and improving a power factor, connected to each phase of said power system.

9. An apparatus according to claim 5, wherein said calculating means comprises:
    means for detecting a DC current flowing through said AC/DC converting means;
    phase angle control means for calculating a phase control angle of said AC/DC converting means based on a difference between said DC current detected by said detecting means and a reference current; and
    means for calculating reactive power according to a product of a sin value of said phase control angle calculated by said phase angle control means and said DC current detected by said detecting means.

10. An apparatus according to claim 5, wherein said calculating means comprises:
    means for detecting a DC current flowing through said AC/DC converting means;
    phase angle control means for calculating a phase control angle of said AC/DC converting means based on a difference between said DC current detected by said detecting means and a reference current;
    means for detecting a no-load DC voltage of said power system; and
    means for calculating reactive power according to a product of a sin value of said phase control angle calculated by said phase angle control means, said DC current detected by said current detecting means and the no-load DC voltage detected by said voltage detecting means.

* * * * *